E. E. F. CREIGHTON.
PROTECTION OF TRANSMISSION SYSTEMS.
APPLICATION FILED APR. 29, 1909.

1,230,680.

Patented June 19, 1917.
2 SHEETS—SHEET 1.

Witnesses:
J. Ellis Glen
J. Earl Ryan.

Inventor
Elmer E. F. Creighton,
by Albert G. Davis
Att'y.

E. E. F. CREIGHTON.
PROTECTION OF TRANSMISSION SYSTEMS.
APPLICATION FILED APR. 29, 1909.

1,230,680.

Patented June 19, 1917.
2 SHEETS—SHEET 2.

Witnesses:
J. Ellis Glen.
J. Earl Ryan.

Inventor
Elmer E. F. Creighton.
by Albert G. Davis
Att'y.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTION OF TRANSMISSION SYSTEMS.

1,230,680. Specification of Letters Patent. Patented June 19, 1917.

Application filed April 29, 1909. Serial No. 492,846.

*To all whom it may concern:*

Be it known that I, ELMER E. F. CREIGHTON, a citizen of the United States, residing at Schenectady, county of Schenectady, State of New York, have invented certain new and useful Improvements in Protection of Transmission Systems, of which the following is a specification.

My invention relates to electrical transmission systems, and has for its object the protection of such systems from high potential stresses. The particular disturbances which cause the high potential stresses, to which my invention relates, are those which occur when an intermittent or arcing ground occurs upon such a system, and I accomplish the object of my invention through preventing such disturbances by solidly grounding the conductor of the system upon which such a ground occurs.

At the present stage of the electric art, power is transmitted from the various localities where it is generated or produced, to various other localities where it is distributed or used. This power is usually transmitted by means of electrical conductors which are carried on insulators supported by suitable poles or towers. It frequently happens that a ground takes place upon a conductor of such a system. Such a ground may occur from a number of causes, such as a breakdown or arcing over of an insulator on one of the poles or towers, the rubbing of a branch of a tree against one of the conductors, etc. Such a ground is often not of a permanent character, but is an intermittent connection between ground and the conductor or a so-called "arcing" ground. It has been found that such intermittent or arcing grounds tend to set up high voltage surges in the conductors of the transmission system, which expose the conductors and the electrical apparatus upon the system to high potential stresses of a greater value than that for which they are ordinarily designed. The result of such stresses is to strain or break down the insulation of the conductors or the electrical apparatus, and frequently a serious loss results therefrom.

If a conductor of such a system be solidly grounded,—that is, the ground is made of such a solid or permanent character that it is not intermittent and no arcing can occur, these high voltage surges do not take place. When a conductor of a three-phase system, for example, is permanently grounded while the voltage between various portions of the conductors of the system and ground may be greatly increased over that where there is no ground upon the system, high voltage surges will not occur, and the insulating material will only be subject to the increased high voltage stress due to grounding a conductor of the system. The rise in voltage which occurs when these high voltage surges take place is much greater than that due to a solid ground upon the system. I, therefore, accomplish the object of my invention by the employment of a mechanism arranged so as to make a solid ground connection with a conductor of such a system when such conductor has an intermittent or arcing ground upon it.

For a further understanding of my invention, reference may be had to the accompanying drawings, where.

Figure 1:
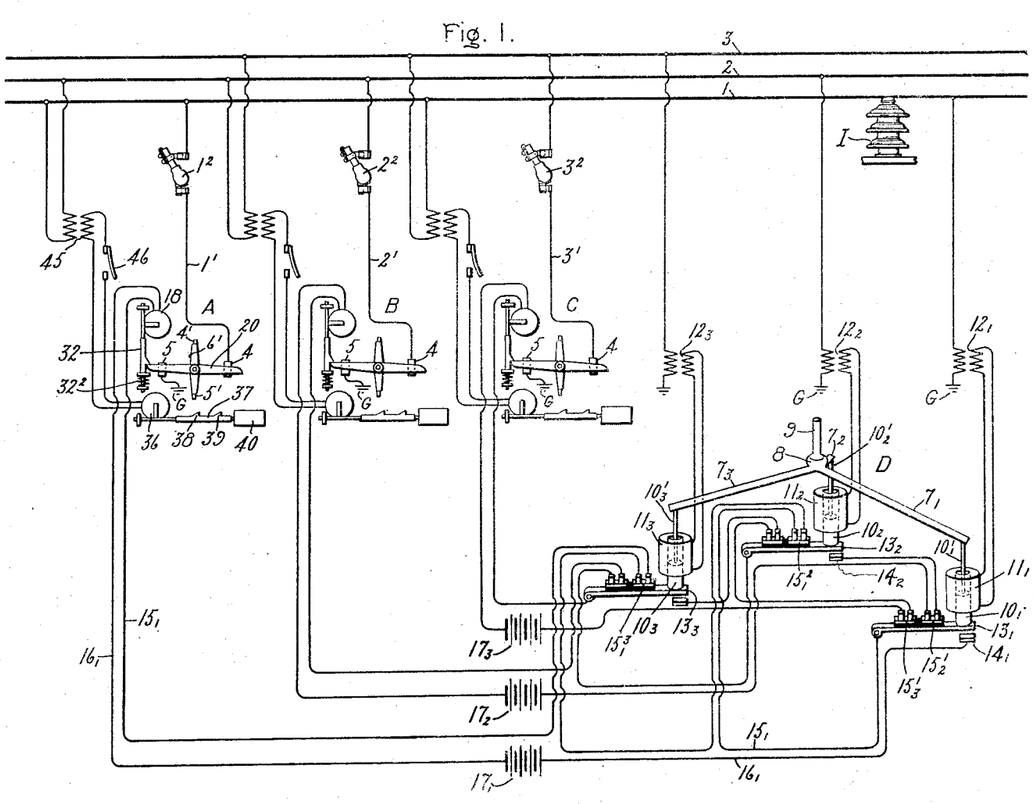
Figure 1 shows a diagrammatic view of the connections which I employ for carrying out my invention.

Referring first to Fig. 1, I have shown conductors 1, 2, 3 of a three-phase electric transmission system. While I have illustrated my invention as applied to a three-phase system, it is obvious that with suitable modifications my invention may be applied to other kinds of electric transmission systems. The conductors of the system may be supported by insulators, one of which I have shown at I, supporting conductor 1. I prefer to make these insulators in such a fashion that the insulation resistance around their surfaces is less than through the bodies of the insulators, or that they will be weaker around their surfaces than through their bodies to potential stresses. This form of insulator is well known to those skilled in the art. In operative relation with the conductors of the system are three switches A, B, C, each connected to one conductor of the system and each adapted to independently make a solid connection between it and ground. This connection is made by members 4 connected by conductors $1^1, 2^1, 3^1,$ respectively, to the conductors 1, 2 and 3, and through the switch mechanisms, by members 5 to ground G. Fuses $1^2$, $2^2$ and $3^2$ may be placed, if desired in series with conductors $1^1$, $2^1$, $3^1$ for purposes of safety.

Actuating these switches is a switching device D of which a further description will be given later.

Figures 2, 3, 4:
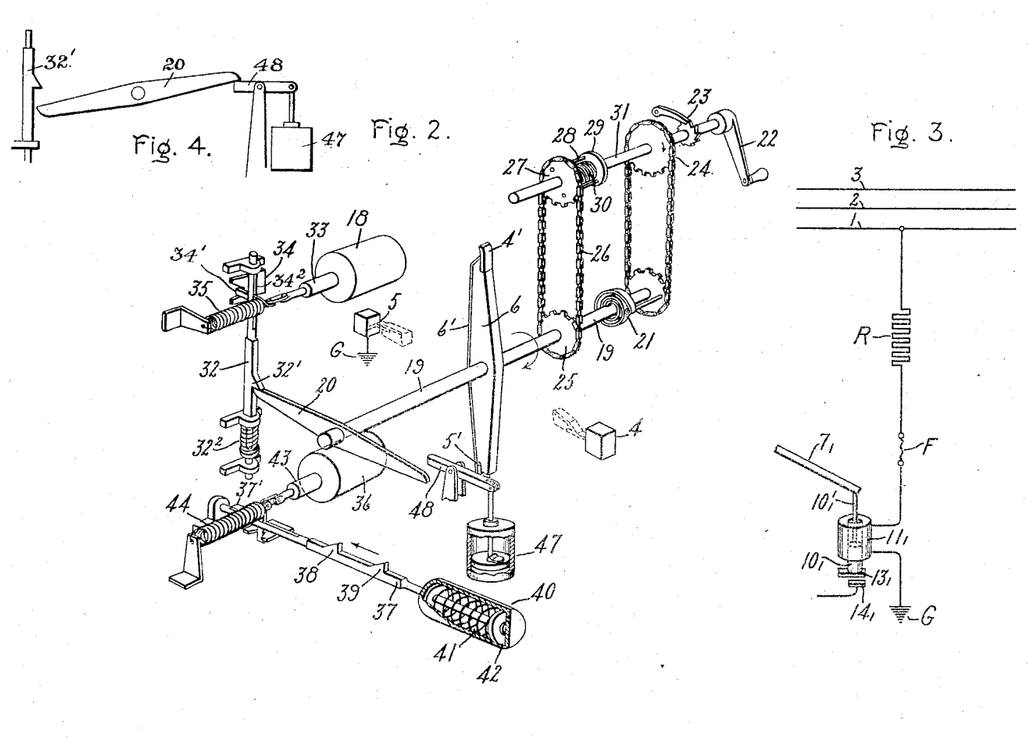
Fig. 2 shows a diagrammatic view in perspective on a larger scale of a portion of the apparatus which I employ.
Fig. 3 shows a modification of certain of the connections shown in Fig. 1.
Fig. 4 shows a vertical view of a portion of the mechanism shown in Fig. 2.

This device consists of a movable member having three arms $7_1$ $7_2$ $7_3$. This member is attached by means of a ball-and-socket joint 8 to a fixed support 9 in such a manner that it may be moved about a fixed point, which will be substantially the central point of the ball-and-socket joint 8. By this arrangement any of the arms, or any two of the arms simultaneously, may be moved upward or downward. Attached to the arms are cores of magnetic material $10_1$ $10_2$ $10_3$, which cores are suspended from the arms by suspension members $10^1_1$ $10^1_2$ $10^1_3$. Energizing windings or solenoids $11_1$ $11_2$ $11_3$ are adapted when energized to move the cores. The solenoids may be energized by the secondaries of transformers $12_1$ $12_2$ $12_3$, the primaries of which are connected between ground and conductors 1 2 3, or may be energized directly from the conductors as shown in Fig. 3. As the switches A B C are similar and the switching device D is arranged to actuate each of these switches independently under certain conditions, I shall confine my further description to one of the switches and to the portion of the switching device D which actuates that switch, and it will be understood that the description applies equally to the other switches and to the portions of the switching mechanisms D which operate these other switches.

In operative relation with core $10_1$, is a switch composed of a movable member $13_1$ and a stationary member $14_1$. This switch is connected through conductors $15_1$ $16_1$ and a source of energy such as a battery $17_1$ to trip coil 18 of switch A. Member $13_1$ is arranged to close the circuit of solenoid 18 when core $10_1$ descends. One of the conductors of the electric circuit which energizes solenoid 18, and is closed by contact members $13_1$ and $14_1$ is arranged to be in series with two interlocking switches $15_1^2$ $15_1^3$ in operative relation with members $13_2$ $13_3$ so that if either switch operated by magnetic cores $10_2$ or $10_3$ is closed, it is impossible to close the electric circuit operating solenoid 18. Member $13_1$ has interlocking switches $15_2^1$ and $15_3^1$ in operative relation with it so that when member $13_1$ is in contact with member $14_1$, closing the magnetic circuit for energizing solenoid 18, the corresponding solenoids of switches B and C cannot be energized.

Referring now to Fig. 2, which shows an approved embodiment of the switch mechanism which I have devised, 19 is a rotatable shaft. Fastened to this shaft is member 6 carrying a conducting member $6^1$ and two contacts $4^1$ $5^1$ connected thereto, which normally are not in contact with stationary conductors 4 5. Fastened to the shaft is another member 20, which may be used for locking the shaft in a certain position. Attached to the end of the shaft opposite member 20 is a spring 21 which may be wound by handle 22 and chain driving device 24 in a manner well understood by those skilled in the art; the unwinding of the spring being prevented by a ratchet and pawl 23 and a locking device 32 acting upon member 20.

Attached to the shaft 19 is a wheel 25 driving by means of chain 26 a wheel 27, which is loosely fastened to shaft 31 attached to handle 22. Wheel 27, by means of two pins 28, drives a nut 29 loosely connected to these pins moving on screw-thread 30 fastened to shaft 31. The object of this mechanism is to be an indicating device and show how much spring 21 is unwound, and the method in which it works is as follows:—If handle 22 be turned so as to wind up the spring, it will turn screw-thread 30, which will tend to make nut 29 move toward wheel 27 as wheel 27 is loose on shaft 31, but is held fixed by means of chain 26. After the spring has been wound up a certain amount nut 29 will assume a certain position. When spring 21 unwinds, it will cause wheel 27 to rotate through the action of wheel 25 and chain 26, and this will cause nut 29 to rotate in a direction reverse from the one in which it was made to rotate by handle 22, as it is driven by pins 28. This will cause the nut to move in a direction away from wheel 27.

Locking member 20 is shown in engagement with a locking device 32 with a projection $32^1$. Member 32 is held in position by mechanism 34. This mechanism consists of a stationary flat plate having a notched end as shown. Against this end, rests one end of a bar or rod $34^1$ extending through slot $34^2$ formed in the upper end of member 32. This allows member 32 to have a longitudinal motion. Attached to the other end of bar $34^1$ is a magnetic core 33 adapted to be moved by solenoid 18 and thus release member 20, since the core pulls rod $34^1$ horizontally and thus turns projection $32^1$ from out of engagement with the end of member 20. Core 33 pulls against the action of spring 35, so that when solenoid 18 is de-energized the mechanism and member 32 will be in the position shown. Member 20, through the action of spring 21 tends to push member 32 in an upward position against the action of spring $32^2$. After the locking mechanism has been released by solenoid 18, spring $32^2$ pulls latch 32 down so as to be in a position to catch member 20 upon its subsequent rotation. 37 is a second locking device consisting of a bar having two latches 38 39. One end of member 37 is arranged in operative relation to a mechanism 40, which consists of a spring 41 and a dashpot mechanism 42. The other end of member 37 has a release mechanism $37^1$ similar to that described for the first locking device consisting of a rod passing through a slot and normally held by a fixed plate. This construction as previously explained, permits a longitudinal motion of the latches, thus releasing member 20. The release mechanism $37^1$ is actuated by a solenoid 36 in operative relation with the magnetic core 43 pulling against the spring 44. Solenoid 36 is energized by the secondary of transformer 45 connected between two of the line conductors (Fig. 1). Switch 46, Fig. 1, completes the circuit for solenoids 36. A damping mechanism is shown attached to a member 48, which is in operative relation to the ends of members 20, and under certain conditions, as will be explained more in detail later retards the movement of member 20. Fig. 4 shows one end of member 20 in operative relation with the damping mechanism, and before the other end of such member has been engaged by projection $32^1$.

The operation of my device is as follows:—Switching member D (Fig. 1) is so arranged that when there is no ground connection with any conductor of the system, the moving member with the three arms $7_1$ $7_2$ $7_3$ is in the position shown, and the cores $10_1$ $10_2$ $10_3$ are in such a position as not to close the switches A B C. Switches A B C have their springs wound up as may be indicated or so that there is a tendency for members 6 (Fig. 2) to rotate, which tendency is counteracted by the locking mechanism first described, which locks the switches in such a position that members $6^1$ are out of contact with the stationary conductors. Transformers $12_1$ $12_2$ $12_3$ are equally energized and therefore balanced and switches 46 are opened as shown in the figure. If a ground occurs upon any conductor, such as conductor 1, for example, current will flow in the primaries of transformers $12_2$ and $12_3$, but will not flow in the primary of transformer $12_1$, as its primary will be short-circuited to ground. The result of this flow of current will be that solenoids $11_2$ and $11_3$ are energized and solenoid $11_1$, deënergized and pull up their cores $10_2$ and $10_3$. By this action arms $7_2$ and $7_3$ will be raised, arm $7_1$ will be lowered and core $10_1$ will move downward, making contact between members $13_1$ and $14_1$. When contact is made between these members, the circuit comprising conductors $15_1$ and $16_1$, and the source of energy $17_1$, will be closed and solenoid 18 of switch A will be energized. This will release locking mechanism 34, as core 33 will pull the end of rod $34^1$ toward it, thus turning projection $32^1$ out of engagement with member 20, and the action of the wound spring 21 will cause shaft 19 to revolve in the direction shown by the arrow until contact is made between members 4 and 5, as shown in Fig. 2 by the dotted lines showing the ends of member 6 and contacts $4^1$ $5^1$—that is, conductor 1 is solidly grounded. The shaft and member 6 will be held in this position by the action of the second locking mechanism on member 20, through the engagement of it and latch 38. Member 20 will have a tendency to shove member 37 in the direction shown by the arrow, which tendency is resisted by spring 41 and dashpot mechanism 42. After a time predetermined by the adjustment of spring 41 and dash-pot mechanism 42 in a manner well understood by those skilled in the art member 37 will have moved sufficiently under the influence of spring 21 to release member 20. After member 20 has been released by latch 38 on member 37, it will come in contact with member 48, which is arranged so as to restrain its movement for a certain period before it comes in contact with latch 32. It then will be released by the damping mechanism, and will strike against projection $32^1$ as may be clearly seen in Fig. 4. During the interval that member 20 is held by latch 38, and subsequently by member 48, the mechanism D will right itself,—that is, will be in the position shown in the drawings if the arcing or intermittent ground has disappeared. I employ damping mechanism 47 to give a greater time-interval between the time that member 20 is first released by latch $32^1$ and subsequently strikes against it, as I have found that the employment of damping mechanism 40 in connection with the second locking device is not sufficient at times to give sufficient time to allow mechanism D to assume a normal position if the intermittent ground has ceased.

If the arcing or intermittent ground still exists on conductor 1, then due to the action of switching device D, solenoid 18 is still energized so that locking device 32 is released and member 20 will swing by this mechanism until it is caught by the second locking mechanism through the action of latch 39. The position in which it is caught is such that conducting member $6^1$ is in contact with stationary conductors 4 5 and conductor 1 is again solidly grounded. Member 20 catches against latch 39 for the reason that dash-pot mechanism 42 is adjusted to return member 37 to its original position very slowly, and when latch 38 has released member 20, the movement of locking member 37 is slower than that of member 20. Switch A is now permanently locked in such a position that conductor 1 is solidly grounded and this ground can only be broken by the operation of the second release mechanism actuated by solenoid 36 to actuate which, switch 46 must be thrown by an attendant.

The object of the mechanism which I have described is as follows:—It frequently happens that an arcing or intermittent ground exists on a transmission system that will not cause any appreciable damage to the insulators of the system if they are made in such a way as I have previously described,—namely, weaker around their surfaces than through their bodies to potential stresses. The object of making the insulators in this way is that in case a high potential stress is set up by a high-voltage surge, they will not be punctured by these high-voltage stresses, and thus it will not be necessary to replace them, as is well known is frequently the case at the present time. When the intermittent or arcing ground occurs and switch A is operated in the manner which I have described, making a solid ground for the conductor, the arc around the surface of the insulator or insulators will be extinguished and thus the danger to the insulators themselves of high potential surges will be eliminated, but the conductor is not at first permanently grounded. After a predetermined time the solid ground connection for the conductor is broken. If the insulation of the line is not permanently damaged and the intermittent or arcing ground is not reëstablished, the switch A will be held in the position, shown in the drawing, as switching device D will return to its normal position, or the position shown, since all of the transformers $12_1$ $12_2$ $12_3$ are equally energized, and hence solenoid 18 of switch A will be deënergized, and the first locking mechanism 32 will operate to hold member 20 in the position shown in the figures. If, however, the intermittent or arcing ground connection has not ceased, the locking mechanism 32, owing to the energization of solenoid 18, will release member 20 when it comes in contact with projection $32^1$, and member 20 will assume the position described, held by the second locking mechanism by the action of the projection 39. In this position conductor 1 is solidly grounded, and in order to open this ground, it is necessary for an attendant to manually operate switch A, by means of switch 46. The movement of the nut 29 can, in a number of different ways known to the art, be made to draw attention to the fact that there is a ground on conductor 1 distinct from that caused by switch A and allows the attendant to take suitable steps to clear conductor 1.

It will be obvious that the operation which I have described, when a ground occurs upon conductor 1, will similarly take place in the other circuits when a ground occurs on another phase such as 2 or 3; switches B or C coming into action instead of switch A, as described. If a ground occurs on a conductor of the system, such as conductor 1, for example, of such a character that the mechanism I have described permanently grounds this conductor and a ground occurs on the second conductor, such as conductor 2 or 3 the interlocking mechanism which I have described in connection with the switching device D operates to prevent switches B or C acting simultaneously, and thus causing a dead short-circuit upon the system. The action of this interlocking mechanism is as follows:—If conductor 1, for example, be grounded, so that switch A has been actuated, and core $10_1$ is pushed down, and then conductor 2, for example, becomes grounded, the primary circuit of transformer $12_2$ will be deënergized, and as a result solenoid $11_2$ will be deënergized, while solenoid $11_3$ will still be energized. This will cause magnetic core $10_3$ alone to be pulled up, and will cause core $10_2$, as well as core $10_1$ to drop, making contact between members $13_2$ and $14_2$. This would tend to energize solenoid $18_B$ and actuate switch B were it not for the fact that when core $10_1$ is already in its lowest position interlocking switch $15_2{}^1$ has been opened, so that it is impossible to energize solenoid $18_B$ when solenoid 18 is energized. It will be obvious that a similar condition will exist if any switch is actuated and a ground occurs upon any conductor connected to any second switch. The interlocking mechanism which I have described is of such a character as to prevent the simultaneous operation of two switches or to prevent the closing of two electric circuits operating switches A B C through device D at the same time. As a further precaution, to prevent a double ground on the system a fuse $1^2$, &c., are placed in series between 4 and the line conductors.

It will be obvious that in addition to the screw mechanism 29, which I have described as calling the attention of an attendant to the fact that one of the conductors of the system is grounded, other indicating devices may be used to show whether a conductor is grounded, in connection with switches A B C or device D, and that while I have shown one embodiment of my invention that it may be embodied in a number of forms. Fig. 3 shows a modification of the connections which I may employ with switching mechanism D. This modification consists in energizing the solenoids attached to the several arms of the mechanism, not by transformers, but by a direct connection with the conductors.

I have shown the connections as applied only to conductor 1 and that portion of switching mechanism D which affects this conductor, but it is obvious that it will be similar in character for all the conductors. Conductor 1 is connected directly to solenoid 11₁ through resistance R, and a fuse F may be inserted for safety, if desired. The other terminal of solenoid 11₁ is connected to ground. The several solenoids will then be energized in exactly the same manner as described in connection with Fig. 1, and if a ground occurs on any of the conductors, such as conductor 1, its corresponding solenoid will be short-circuited and the switching mechanism D will operate in the manner already described.

I therefore do not limit myself to any particular arrangement or connection of parts, but seek in the appended claims to cover all arrangements or connections which will not depart from the scope of my invention, and will be obvious to those skilled in the art.

What I claim as new and desire to secure by Letters Patent of the United States, is,—

1. The method of protecting an electric system from high voltage stresses due to an intermittent connection between said system and ground consisting in causing a current to flow upon such connection and actuate a device making a solid connection between the system and ground for a predetermined time and then breaking the solid connection.

2. The method of protecting an electric transmission system from high voltage stresses due to an intermittent connection between a conductor of the system and ground, consisting in causing a current to flow upon such a connection and actuate a device making a solid connection between the conductor and ground for a predetermined time and then breaking the solid connection.

3. The method of protecting an electric system from high voltage stresses due to an intermittent connection between a conductor of the system and ground consisting in making a solid connection between the conductor and ground for a predetermined time, opening the connection, and remaking it if the conductor is still connected to ground.

4. The method of protecting an electric system from high voltage stresses due to an intermittent connection between a conductor of the system and ground consisting in making a permanent connection between the conductor and ground for a predetermined period, automatically opening such connection at the end of the period and automatically remaking it if a connection between the conductor and ground still exists.

5. In combination, an electric transmission system, means for grounding said system and opening said ground automatically thereafter, and means responsive to unbalancing of said system controlling said grounding means.

6. In combination, an electric transmission system comprising conductors, means for grounding a conductor of said system and opening said ground automatically thereafter, and means responsive to an arcing ground upon said conductor controlling the operation of said grounding means.

7. In combination, an electric transmission system comprising conductors, means for grounding a conductor of said system and opening said ground automatically thereafter, and means responsive to unbalancing of said system controlling said grounding means.

8. In combination, an electric transmission system, means responsive to an arcing ground upon said system, and means controlled by said first mentioned means for making connection between any conductor of said system and ground for a predetermined period, then opening said connection, and finally remaking said connection if the ground exists upon the conductor of the system after the connection has been broken.

9. In combination, an electric transmission system comprising conductors, means responsive to an unbalancing of said system due to an arcing ground upon a conductor of said system, and means controlled by the first mentioned means for momentarily grounding said conductor and then permanently grounding the same if the ground on the system exists after the momentary grounding.

10. In combination, a transmission system, a ground indicator in operative relation therewith, a switch for grounding said system, and means controlled by said indicator for closing said switch and automatically opening said switch thereafter.

11. In combination, a transmission system having a plurality of conductors, a switch for grounding one of said conductors only, and another means connected to another conductor and to ground controlling the actuation of said switch.

12. In combination, a transmission system having a plurality of conductors, a switch for grounding one of said conductors only, and a solenoid connected to another conductor and to ground controlling the actuation of said switch.

13. In combination, an electric transmission system, a switch for solidly grounding a conductor of the system, means operative upon a grounding of the conductor for closing said switch for a predetermined period, opening it, and reclosing it if the conductor is still grounded.

14. In combination, an electric transmission system, a switch for solidly grounding a conductor of the system, means operative upon a grounding of the conductor for closing the switch, means for opening the switch after a predetermined period, and means operative if the conductor is not grounded for holding the switch open.

15. In combination, an electric transmission system, a switch for solidly grounding a conductor of the system, means operative upon a grounding of the conductor for closing the switch, means for opening the switch after a predetermined period, and means for reclosing the switch and holding it closed if the conductor is grounded.

16. In combination, a polyphase transmission system, means for independently solidly grounding each conductor of the system, and a second means operative upon a grounding of a conductor of the system actuating the first means to ground said conductor.

17. In combination, an electric transmission system, switching devices connected to the conductors of the system for independently grounding each conductor of the system, fuses between the switching devices and the conductors, and means operative upon a grounding of a conductor of the system for actuating the switching devices to solidly ground said conductor alone.

18. In combination, a polyphase transmission system, means for independently solidly grounding each conductor of the system, a second means operative upon a grounding of a conductor of the system actuating the first means, and means operative upon the grounding of a conductor for preventing the simultaneous grounding of two conductors by the first means.

19. In combination, a polyphase transmission system, means for independently solidly grounding each conductor of the system for a predetermined period and then breaking the ground connection, and a second means operative upon a grounding of a conductor of the system for actuating the first means to ground said conductor.

20. In combination, a polyphase transmission system, means for independently grounding each conductor of the system for a predetermined period, breaking the ground connection and remaking it if the conductor is grounded, and a second means operative upon a grounding of a conductor of the system for actuating the first means to connect said conductor to ground.

21. In combination, a polyphase transmission system, switches adapted to ground each conductor of the system, and means operative upon the grounding of a conductor of the system for actuating one of said switches.

22. In combination, a polyphase transmission system, switches adapted to solidly ground each conductor of the system, means operative upon the grounding of a conductor of the system for actuating the switch adapted to ground said conductor, and means preventing the simultaneous action of two of said switches.

23. A switch comprising a rotatable shaft, a spring causing said shaft to rotate as it unwinds, means for winding said spring, an indicator of the degree of tension of the spring, a conducting member fastened to said shaft, stationary conductors adapted to make contact with said member, a locking device locking said shaft in such a position that the movable conductor is out of contact with the stationary conductors, electromagnetic means for releasing said locking device, a second locking device locking said shaft in such a position that the movable and stationary conducting members are in contact, said device comprising a latch locking said shaft for a predetermined time, releasing the shaft and relocking it if the first locking device is released, means for releasing the second locking device a second time, and a damping mechanism for retarding the movement of the shaft after it has been released by the second locking device.

24. A switch comprising a rotatable shaft, a spring causing said shaft to rotate as it unwinds, means for winding said spring, a conducting member fastened to said shaft, stationary conductors adapted to make contact with said member, a locking device locking said shaft in such a position that the movable conductor is out of contact with the stationary conductors, electromagnetic means for releasing said locking device, a second locking device locking said shaft in such a position that the movable and stationary conducting members are in contact, said device comprising a latch locking said shaft for a predetermined period, releasing the shaft, and relocking it if the first locking device is released, and means for releasing the second locking device a second time.

25. In combination, a transmission system, a switch adapted to independently solidly ground each conductor of said system, said switches comprising a rotatable shaft, means for causing said shaft to rotate, a conducting member fastened to said shaft, stationary conductors adapted to make contact between ground and a conductor of the system for a certain position of said member, a locking device for locking said member in a position to be out of contact with the stationary conductors, means for releasing said locking device, a second locking device locking said member in a position to be in contact with the stationary conductors, means for releasing said device, and means for preventing the simultaneous solid grounding of two conductors.

26. In combination, a transmission line, a switch adapted to independently solidly ground each conductor of said line, and a switching device for actuating said switches, comprising means operative upon a ground connection with any conductor to actuate the switch solidly grounding said conductor, and means for preventing the actuation of a second switch when one has been actuated.

27. In combination, a transmission line, a switch adapted to independently solidly ground each conductor of said system, and a switching device for actuating said switches, comprising a movable member, means operative upon a grounding of a conductor of the system to move said member, and means operative upon a movement of said member to actuate the switch solidly grounding said conductor.

28. In combination, a transmission line, a switch adapted to independently solidly ground each conductor of said system, and a switching device for actuating said switches, comprising a movable member, magnetic cores attached to the member, energizing windings adapted to move the same and the member, means for energizing said windings, means adapted upon movement of the cores for actuating the switches, and means for preventing the simultaneous actuation of two switches.

29. In combination, a transmission line, a switch adapted to independently solidly ground each conductor of said system, and a switching device for actuating said switches, comprising a movable member having arms, a magnetic core attached to each arm, an energizing winding adapted to move the same and the member, each winding energized by a circuit dependent upon a conductor of the system, connections for energizing the windings upon the grounding of a conductor, electromagnetic means operative upon a movement of the cores upon the energization of the windings for actuating the switch solidly grounding the grounded conductor, and interlocks preventing the simultaneous actuation of two switches.

30. In combination, a three-phase transmission system, a switch adapted to independently solidly ground each conductor of said system, and a switching device for actuating said switches comprising a member movable about a fixed point having three substantially horizontal arms, magnetic cores fastened to each arm, energizing windings adapted when energized to move the cores in a substantially vertical direction, transformers each having their primaries connected between one of the conductors of the transmission system and the ground, and their secondaries each connected to one of the solenoids, and electromagnetic means adapted to operate the switches actuated by a movement of the cores interconnected to prevent a simultaneous actuation of two switches.

31. A switching device comprising a movable member having arms, a magnetic core attached to each arm, an energizing winding for each core adapted to move the same and the movable member, and electric circuits closed by switches in operative relation to each core with interlocking switches in operative relation to the first switches connected to prevent the closing of more than one circuit at the same time.

32. A switching device comprising a member movable about a fixed point and having three substantially horizontal arms, a magnetic core fastened to each arm, energizing windings for each core adapted to move the cores in a substantially vertical direction, means for energizing said windings, an electric circuit for each core having a switch in operative relation to that core and interlocking switches in operative relation to the remainder of said first mentioned switches to prevent the closing of more than one circuit at the same time.

33. In combination, a three-phase electric circuit, a switch adapted to independently solidly ground each conductor of the circuit, said switches comprising a rotatable shaft, means for causing said shaft to rotate, a conducting member fastened to the shaft, stationary conductors adapted to make contact between ground and conductor of the system for a certain position of said member, a locking device for locking said member in a position to be out of contact with the stationary conductors, electrically operated means for releasing said device, a second locking device locking said member in a position to be in contact with the stationary conductors for a predetermined time releasing the member at the expiration of the time and permanently relocking it if the first locking device is released, electrically operated means for releasing the second locking device, and a switching device for actuating said switches comprising a member movable about a fixed point having three substantially horizontal arms, magnetic cores fastened to each arm, energizing windings for each core adapted when energized to move the cores and the movable member, transformers each having a primary winding connected between one phase of the system and ground, and a secondary winding connected to one of the said windings, an electric circuit and a source of energy adapted to operate the first lock releasing means of each grounding switch and having switches in operative relation with each magnetic core adapted to close the circuits upon a movement of the cores, and interlocking switches preventing the closing of more than one circuit at the same time.

34. The combination with an electric transmission system comprising conductors, of shunting means for closing a connection to shunt an arc upon a conductor of said system and thereafter automatically opening said connection, and means responsive to an arc upon said conductor for controlling the operation of said shunting means.

35. The combination of an electric transmission system comprising conductors, switching devices connected to the conductors of the system for independently establishing an electrical connection to each conductor of the system to shunt an arc upon said conductor, fuses in said connections in series with the switching devices, and means operative upon the occurrence of an arc upon any conductor of the system for actuating said switching devices to establish the electrical connection to shunt the arc upon said conductor alone.

36. In combination a polyphase transmission system comprising conductors, a connection for shunting arcs occurring on said conductors, said connection comprising a switch and a fuse in series, and means operative in response to variations produced by said arc in the electrical conditions of the system for actuating said switch to close said connection and shunt said arc.

37. A system for extinguishing arcs occurring on transmission lines comprising line wires, a normally open switch and its contacts for each line wire, a connection from each line wire to one contact of its switch, a connection from each switch to the ground, means for closing each switch responsive to changes in the electrical condition of its line wire and means for opening said ground connections when a certain current passes therethrough.

38. A system for extinguishing arcs on transmission lines comprising in combination with the line wires, a shunt connection from each line wire for shunting an arc upon said wire, a normally open switch in each connection, means for closing each switch responsive to variations in the electrical condition in its line wire produced by an arc upon said line wire, and means for opening said connection upon a certain amount of energy passing therethrough.

39. A system for extinguishing arcs on transmission lines comprising in combination with the transmission line, an electrical connection for shunting an arc on the line, a normally open switch in said connection, mechanical means for closing the switch, an electroresponsive device for controlling the action of said mechanical means to close the switch, and means for automatically opening said shunt connection upon the passage of a predetermined current through said connection.

40. A system for extinguishing arcs occurring on high tension lines comprising in combination with polyphase line wires, a connection from each line wire to the ground, a normally open switch in each connection, mechanical means for closing each switch by mechanical force, an electroresponsive device for each switch for controlling the action of said mechanical means to close its switch responsive to changes in the electrical condition of its line wire, and means for opening said ground connections upon a certain amount of energy passing therethrough.

41. A system for extinguishing arcs occurring on transmission lines comprising in combination with polyphase transmission line wires, an electrical connection for each phase line wire for shunting the arc thereon, a normally open switch in each connection, mechanical means for closing each switch by mechanical force, and an electroresponsive device for each switch for controlling the action of its mechanical means, to close the switch responsive to variations in the electrical condition of the system, and means for automatically opening said shunt connection upon the passage of a predetermined current through said connection.

42. The combination of a transmission line, an electrical connection for shunting an arc on said line, a normally open switch in said connection, means responsive to variations produced by the arc in the electrical condition of the line for closing said switch, and means in said shunt connection for automatically opening said shunt connection upon the passage of a predetermined current through said connection.

43. A system for extinguishing arcs occurring on transmission lines comprising in combination with a plurality of line wires, a connection from each line wire to ground, a normally open switch in each connection, means for closing each switch responsive to variations produced in the electrical condition of its line wire in response to the occurrence of an arc upon said line wire, and fuses for opening said ground connections upon a certain amount of energy passing therethrough.

44. A system for extinguishing arcs on polyphase power transmission lines comprising in combination with the polyphase power transmission line wires, a connection for each phase line wire for shunting an arc occurring on that line wire, a switch for each connection for closing the connection to extinguish the arc, an electroresponsive device controlling the operation of each switch and operating in response to the variations in the electrical condition of its particular phase produced by an arc upon said phase, and means for automatically opening said connections after they have been closed to restore the lines to normal condition.

45. The method of protecting a transmission system from stresses due to an arc on a conductor of the system which consists in automatically closing at a predetermined point of the system and in response to the electrical variations produced in the system by the occurrence of an arc at any point on a conductor a connection for shunting the arc on said conductor and of such low impedance that the arc cannot persist, and then opening said connection.

46. The method of protecting an electric transmission line from stresses due to an arc anywhere on the line which consists in shunting the arc through a path at a fixed point on the line and of less impedance than the arc and in response to the electrical variations produced on the line by an arc at any point on the line and then automatically increasing the impedance of said path after the arc is extinguished.

In witness whereof, I have hereunto set my hand this 28th day of April, 1909.

ELMER E. F. CREIGHTON.

Witnesses:
BENJAMIN B. HULL,
HELEN ORFORD.

Copies of this patent may be obtained for five cents each, by addressing the "Commissioner of Patents, Washington, D. C."